United States Patent
Van Camp

(10) Patent No.: US 9,646,487 B2
(45) Date of Patent: May 9, 2017

(54) PROCESS CONTROL ALARM AUDITING

(71) Applicant: Fisher-Rosemount Systems, Inc., Round Rock, TX (US)

(72) Inventor: Kim Ordean Van Camp, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 0 days.

(21) Appl. No.: 14/828,129

(22) Filed: Aug. 17, 2015

(65) Prior Publication Data

US 2017/0053528 A1    Feb. 23, 2017

(51) Int. Cl.
*G08B 29/00*    (2006.01)
*G08B 29/18*    (2006.01)
*G06F 17/30*    (2006.01)

(52) U.S. Cl.
CPC ..... *G08B 29/185* (2013.01); *G06F 17/30395* (2013.01); *G06F 17/30477* (2013.01)

(58) Field of Classification Search
None
See application file for complete search history.

(56) References Cited

U.S. PATENT DOCUMENTS

2008/0255681 A1* 10/2008 Scott .................. G05B 23/0216
700/12

OTHER PUBLICATIONS

Emerson Process Management, "Delta V Alarm Operations," Product Data Sheet, Nov. 2014, 6 pages.

* cited by examiner

*Primary Examiner* — Adolf Dsouza
(74) *Attorney, Agent, or Firm* — Hanley, Flight & Zimmerman, LLC

(57) ABSTRACT

Methods, apparatus, systems and articles of manufacture are disclosed to audit process control alarms. An example disclosed method includes identifying components in the process control system that correspond to alarms to be audited. The example method also includes if a query to request a status of a particular one of the alarms to be audited is not in a status update queue, generating a query associated with the audit report request to request the status of the particular one of the alarms from the corresponding component. Otherwise, if the query to request the status of a particular one of the alarms to be audited is in the status update queue, associating the audit report request to the query. The example method also includes transmitting, via a process control system bus, the queries to be designated as low priority.

21 Claims, 8 Drawing Sheets

PROCESS CONTROL ALARM AUDITING

FIELD OF THE DISCLOSURE

This disclosure relates generally to process control systems and, more particularly, to methods and apparatus for process control alarm auditing.

BACKGROUND

Process control systems, like those used in chemical, petroleum or other processes, typically include one or more process controllers communicatively coupled to at least one host or operator workstation and to one or more field devices via analog, digital or combined analog/digital buses. The field devices, which may be, for example, device controllers, valves, valve positioners, switches and transmitters (e.g., temperature, pressure and flow rate sensors), perform functions within the process control system such as opening or closing valves and measuring process parameters. A central process controller receives signals indicative of process measurements made by the field devices and/or other information pertaining to the field devices, uses this information to implement a control routine and then generates control signals that are sent over the buses or other communication lines to the field devices to control the operation of the process control system. Field devices often initiate or generate process control alarms that signal when a parameter of the field device is outside an approved range. These alarms notify operators to help prevent accidents and/or are logged to help troubleshoot the process control system.

BRIEF DESCRIPTION OF THE DRAWINGS

Wherever possible, the same reference numbers will be used throughout the drawing(s) and accompanying written description to refer to the same or like parts

SUMMARY

Figure 1:
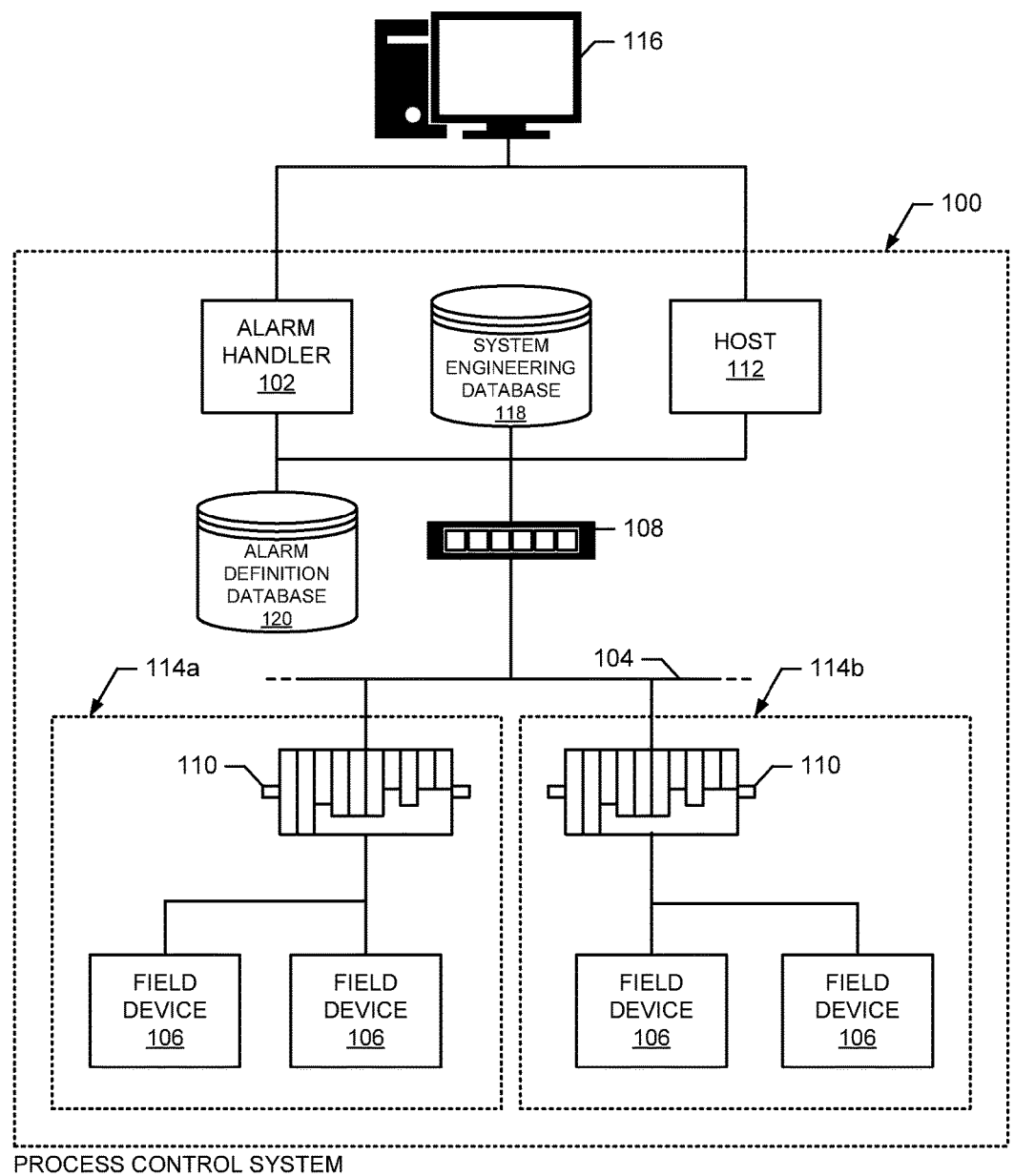
FIG. 1 illustrates an example process control system within which the teachings of the disclosure may be implemented.

Example disclosed methods to manage audit report requests in a process control system include determining alarms to be audited based on alarm audit parameters included with one of the audit report requests. Example disclosed methods also include identifying components in the process control system that correspond to the alarms to be audited. Example disclosed methods also include, if a query to request a status of a particular one of the alarms to be audited is not in a status update queue, generating a query associated with the audit report request to request the status of the particular one of the alarms from the corresponding component. Example disclosed methods also include, if the query to request the status of a particular one of the alarms to be audited is in the status update queue, associating the audit report request to the query. Example disclosed methods also include transmitting, via a process control system bus, the queries in the status update queue to the corresponding ones of the components when the corresponding components are available, the queries to be designated as low priority. Example disclosed methods also include generating an audit report based on responses generated in response to the queries received from the components Example disclosed apparatus include a query generator to, via a processor, determine alarms to be audited based on alarm audit parameters included with one of the audit report requests, identify components in the process control system that correspond to the alarms to be audited. If a query to request a status of a particular one of the alarms to be audited is not in a status update queue, the query generator is to generate a query associated with the audit report request to request the status of the particular one of the alarms from the corresponding component. If the query to request the status of a particular one of the alarms to be audited is in the status update queue, the query generator is to associate the audit report request to the query. Example disclosed apparatus include a system communicator to transmit, via a process control system bus, the queries in the status update queue to the corresponding ones of the components when the corresponding components are available, the queries to be designated as low priority. Example disclosed apparatus also include a report generator to generate an audit report based on responses generated in response to the queries received from the components.

Example disclosed tangible computer readable storage medium include instructions which, when executed cause a machine to determine alarms to be audited based on alarm audit parameters included with one of the audit report requests, and to identify components in a process control system that correspond to the alarms to be audited. Example disclosed tangible computer readable storage medium also include instructions which, when executed, cause the machine to, if a query to request a status of a particular one of the alarms to be audited is not in a status update queue, generate a query associated with the audit report request to request the status of the particular one of the alarms from the corresponding component. Example disclosed tangible computer readable storage medium also include instructions which, when executed, cause the machine to, if the query to request the status of a particular one of the alarms to be audited is in the status update queue, associate the audit report request to the query. Example disclosed tangible computer readable storage medium also include instructions which, when executed, cause the machine to transmit, via a process control system bus, the queries in the status update queue to the corresponding ones of the components when the corresponding components are available, the queries to be designated as low priority. Example disclosed tangible computer readable storage medium also include instructions which, when executed, cause the machine to generate an audit report based on responses generated in response to the queries received from the components

DETAILED DESCRIPTION

The present disclosure relates generally to process control systems and, more particularly, to methods and apparatus for process control alarm auditing. Process control systems include workstations and/or servers that execute process control applications that interact with controllers to perform routines, control strategies, and/or algorithms that manage field devices located in the control system. The field devices may be, for example, valves, valve positioners, switches and transmitters, and may perform process control functions such as opening or closing valves and measuring process control parameters. In addition to managing field devices, controllers may generate process data (e.g., process control information) based on information received from the field devices. The process data may include process statistics, alarms, monitoring information, process trend information, diagnostic information, field device status information, and/or messages from the field devices.

Process control alarms monitor parameters measured by the field devices to warn operators of conditions that exceed or are about to exceed design limits in the process control system. For example, a temperature probe may measure the air temperature of a gas before it enters the next phase of the process control system. In such an example, a first process control alarm may be set to detect if the temperature of the gas exceeds 250° C. and a second process control alarm may be set to detect if the temperature of the gas exceeds 225° C. Process control alarms may also be assigned a priority based on, for example, the effect on the process control system if the parameter exceeds the alarm condition. Reactions to the alarms also vary based on their priority, ranging from being logged in a log file, to audio and/or visual cues for an operator, to an emergency shutdown of the process control system. For example, the first process control alarm may be assigned a high severity and initiate an audio and visual alarm at a workstation connected to the process control system, whereas the second process control alarm may be assigned a medium severity and initiate a visual alarm at the workstation connected to the process control system.

Process control alarms are configured by system engineers and are maintained in alarm definition database. As used herein, design process control alarm definitions are process control definitions that are designed by the system engineers. The configuration of a process control alarm may be changed by an operator and/or process control logic during runtime. As used herein, runtime process control alarm definitions are process control alarm definitions stored by the field devices and/or the controllers of the process control system. For example, the normal operating conditions for a parameter measured by a field device may be close enough to a value limit of a process control alarm that normal variations in the measured parameter trigger the process control alarm. In such an example, an operator and/or process control logic may change the setting of the process control alarm to reduce that rate at which the process control alarm is triggered. Initially, when a field device is added to the process control system, the runtime process control alarm definition stored in the field device are the same as the design process control alarm definition.

From time to time, (e.g., periodically, aperiodically, etc.), the runtime process control alarm definitions are audited. In some examples, a process control alarm audit determines the difference between the runtime process control alarm definitions and the corresponding design process control alarm definitions. Additionally, the operator and/or the process control logic can suppress process control alarms during runtime by shelving (e.g., temporality disabling for a period of time) the process control alarms or placing the process control alarms out of service (e.g., disabling the process control alarm until it is re-enabled). For example, the operator and/or the process control logic may shelve a chattering process control alarm. As another example, the operator and/or the process control logic may take a process control alarm out of service while a corresponding portion of the process control system is under maintenance.

Traditionally, process control alarms are audited via an Open Platform Communications (OPC) client application accessing an OPC server in the process control system. OPC is a standardized communications protocol for process control systems. The OPC client has access to a list of approved process control settings that the OPC client can request from the OPC server. However, the OPC protocol has a significant performance impact on the process control system. As a result, OPC-based systems limit the number and type of process control alarms that can be audited.

In examples disclosed below, the process control system includes an alarm handler within the process control system. The alarm handler inspects the alarm properties that can be modified at runtime (e.g., by an operator and/or process control logic). The example alarm handler communicates to the controllers and the field devices over a process control bus (e.g., HART® and/or FOUNDATION™ field buses, etc.) and/or manages timing and/or priority of audit queries sent to field devices. In some examples, the alarm handler designates audit queries sent to the controllers and/or the field devices as low priority. In such a manner, the controllers and/or the field devices process the audit requests when the controllers and/or the field devices are not processing a high priority task (e.g., communicating an alarm condition to the host). In some examples disclosed below, the alarm handler sends audit queries based on receiving an audit report request and/or based on a scheduled audit report request. Alternatively or additionally, in some examples, the alarm handler, from time to time (e.g., daily, weekly, etc.) sends audit queries.

In some examples disclosed below, the alarm handler may manage audit report requests to prevent overloading system resources (e.g., processor load, process control system bandwidth, etc.). In some such examples, the alarm handler queues audit report requests to control the number of concurrent audit queries being sent to the field devices and/or the controllers in the process control system. In such a manner, the alarm handler controls the audit queries being sent to the field devices and/or the controllers to prevent intentional or unintentional denial-of-service-type attacks (e.g., sending large and/or frequent audit report requests that cause process control system to degrade because system resources are being used to process the audit report requests).

In examples disclosed below, the alarm handler provides a difference report and/or a runtime report. To generate the difference report, the alarm handler compares the runtime process control alarm definitions and the design process control alarm definitions. The difference report reports the differences between the definitions and/or reports whether the process control alarms are suppressed. The runtime report reports information in the runtime process control alarm definitions, such as, current value limit, current suppression state (e.g., shelved, out-of-service, not-suppressed), the enablement state (e.g., enabled or disabled), priority, etc.

In some examples, the alarm handler reports the operation state (e.g., idle, running, shutdown, etc.) of the field device and/or the controller associated with an alarm to be audited. For example, the alarm handler may indicate that a valve controller is shutdown when an audit report request specifies alarms to be audited associated with the valve controller.

In some examples disclosed below, the alarm handler may provide the difference reports and/or the runtime reports in a standardized format (e.g., a delimiter-separated values (DSV) format, a hypertext markup language (HTML) format, an extensible markup language (XML) format, a JavaScript Object Notation (JSON) format, etc.). In some example, the alarm handler may format the difference reports and/or the runtime reports in accordance with a stylesheet (e.g., XML stylesheet, etc.) In some examples, the alarm handler saves the difference reports and/or the runtime reports to a location on a network specified by the audit report request.

In examples disclosed below, the alarm handler accepts alarm audit requests that specify subsets of alarms to audit. In some examples, an audit report request may specify a priority and/or type of process control alarm to audit. For example, an audit report request may request the alarm handler audit process control alarms designates with a "CRITICAL" priority level corresponding to temperature probes. In some examples, an audit report request may specify a subset of the controllers and/or the field devices for which corresponding process control alarms are to be audited. In some such examples, the subset of the controllers and/or the field devices may be organized into logical and/or geographical divisions (e.g., areas). In such examples, when receiving an alarm audit request specifying a particular subset of the controllers and/or the field devices, the alarm handler determines which controllers and/or field devices and which process control alarms to audit based on a system engineering database. For example, an audit report request may specify an area associated with a MATERIAL_PREP_AREA tag. In such an example, the alarm handler may determine which process control alarms are associated with the MATERIAL_PREP_AREA tag in the system database and then request the runtime process control alarm definitions from the corresponding controllers and/or the corresponding field devices.

In some example disclosed below, the alarm handler accepts the audit report requests that include command line switches. As used herein, a command line switch is an argument to a command that generates an audit report request that modifies the audit report request. For example, a comment line switch may specify a prior-defined audit report request, a location on the network to save the report(s), a subset of alarms to audit, a priority and/or type of process control alarm to audit (e.g., temperature probe alarms, system alarms, process alarms, etc.), etc.

FIG. 1 illustrates an example process control system 100 including an alarm handler 102 as described herein. The example process control system 100 employs a plant process control architecture that integrates one or more smart plant capabilities including field buses 104 (such as HART® and/or FOUNDATION™ field buses), high-speed discrete busses, embedded advanced control, and advanced unit and batch management. Field busses 104 network field devices 106 inside the process control system 100 and provide an infrastructure for a variety of applications, including device management, configuration, monitoring, and diagnostics, etc.

The example process control system 100 includes the example field devices 106, example controller(s) 108, example I/O devices 110, and an example host 112. The example field devices 106 control and/or monitor processes and may, for example, include valves, sensors, proximity switches, motor starters, drives, etc. In the illustrated example, the field devices 106 are commutatively coupled to the I/O devices 110 and the example I/O devices 110 facilitate communication with the example field devices 106. The example I/O devices 110 support a variety of modules to communicate (e.g., via digital and/or analog communication) with a variety of field devices 106. For example, an I/O device 110 may have an analog module to interface with a three-wire temperature probe and a digital module to interface with a digital valve controller. The example I/O devices 110 receive data from the field devices 106 and convert the data into communications capable of being processed by the example controller 108. Additionally, the example I/O devices 110 convert data and/or communications from the example controller 108 into a format capable of being processed by the field devices 106. In some examples, the I/O devices 110 and the controller(s) 108 are combined into one unit.

In the illustrated example, the process control system 100 is divided into areas 114a, 114b that contain the I/O devices 110, the field devices 106 and/or the controller 108 to form subsets of the process control system 100. The example areas 114a, 114b divide the process control system 100 based on logical and/or geographical relationships between the included I/O devices 110, the field devices 106 and/or the controller 108. For example, an area 114a may be defined for the I/O devices 110, the field devices 106 and/or the controller 108 related to processing raw materials. As another example, an area 114b may be defined for the field devices 106 and associated I/O devices 110 contained within a clean room of a manufacturing plant.

The example controller 108 is coupled to the host 112 (e.g., a workstation and/or a server) via a wired or wireless network (e.g., a LAN, a WAN, the Internet, etc.). The example controller 108 controls routines to calculate process data based on outputs from the field device 106 for process control applications including, for example, monitoring applications, alarm management applications, process trending and/or history applications, diagnostic applications, batch processing and/or campaign management applications, statistical applications, streaming video applications, advanced control applications, safety instrumented applications, event applications, etc. The controller 108 forwards process data to the host 112 at periodic intervals and/or upon processing or generating the process data. The process data transmitted by the controller 108 may include process control values, data values, alarm information, text, block mode element status information, diagnostic information, error messages, parameters, events, and/or device identifiers.

In the example illustrated in FIG. 1, the host 112 executes process control applications. The process control applications communicate with the example controller 108 to monitor, control, and/or diagnose the field devices 106. For example, the process control applications may include control automation, graphical representations of the process control system 100, change management, process control editing, data collection, data analysis, etc. In some examples, a display connected to the host 112 displays the process control applications via a user interface to render process data in a graphical format to enable a user of the host 112 to graphically view (via an application) the process data generated by the field devices 106. In some examples, when the process control application is executing on a server, an operator may establish a remote connection from a workstation 116 to the host 112 to access to the process control applications.

Additionally, the example host 112 monitors process control alarms in the process control system 100. In some examples, the host 112 receives messages from the example field devices 106 and/or the example controller 108 indicative of an alarm condition (e.g., a parameter measured by a field device 106 satisfies (e.g. exceeds, falls below, etc.) a threshold defined in a runtime process control alarm definition). In response to receiving an indication of a process control alarm, the host 112 may cause visual and/or audible alerts on, for example, the workstation 116. In the illustrated example, the field devices 106 and/or the controller 108 store the runtime process control alarm definitions that the particular field device 106 and/or the particular controller 108 uses to detect an alarm condition.

The runtime process control alarm definitions may be changed during runtime of the process control system 100. In some examples, an operator may change a value limit of a runtime process control alarm definition. For example, an operator may adjust a value limit for a process control alarm that is chattering (e.g., the alarm parameter is close to the measured parameter under normal operating conditions, causing the process control alarm to be triggered frequently). Additionally, in some examples, control logic may adjust a value limit. For example, a field device 106 may establish a baseline value of a parameter over time and set a value limit to trigger an alarm when there is a sudden spike in the value of the parameter. In some examples, an operator may suppress (e.g., disable) process control alarms by shelving (e.g. temporarily disabling for a period of time) process control alarms and/or taking process control alarms out of service (e.g., disabling until re-enabled).

Figure 2:
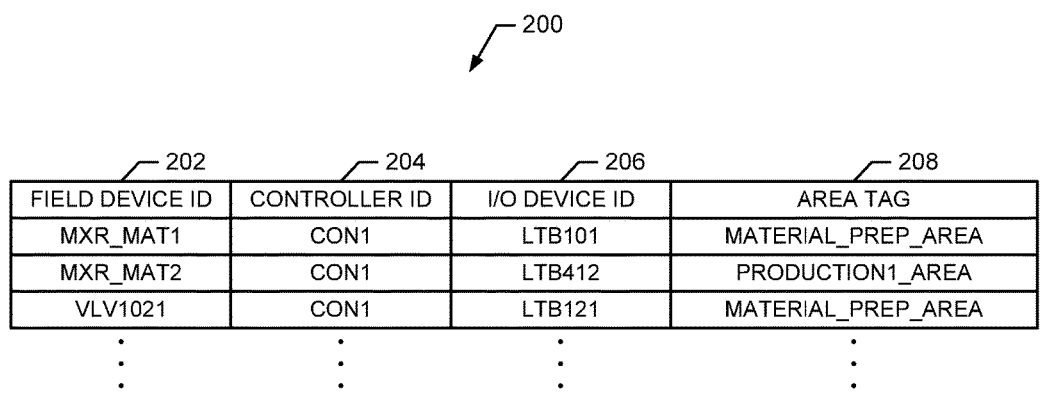
FIG. 2 depicts an example data structure that identifies relationships between components of the example process control system of FIG. 1.

In the illustrated example of FIG. 1, the process control system 100 includes an example system engineering database 118. FIG. 2 depicts an example data structure 200 stored in the system engineering database 118 that identifies relationships between components (e.g., the field devices 106, the I/O devices 110, the controller 108, etc.) of the example process control system 100. In the illustrated example of FIG. 2, the data structure 200 includes an example field device identifier (ID) 202, an example controller ID 204, an example I/O device ID 206, and an example area tag 208. The example field device identifier 202 uniquely identifies a field device 106 in the example process control system 100. The example controller ID 204 uniquely identifies a controller 108 in the example process control system 100 to which the corresponding field device 106 is communicatively coupled. The example I/O device ID 206 uniquely identifies the I/O device 110 in the example process control system 100 to which the corresponding field device 106 is communicatively coupled. The example area tag 208 uniquely identifies an area 114a, 114b in the example process control system 100 to which the corresponding field device 106 is assigned.

Returning to the example illustrated in FIG. 1, the example alarm handler 102 audits process control alarms in the process control system 100. To audit a process control alarm, the alarm handler 102 sends audit queries, via the field bus 104, to the field devices 106 and/or the controller 108. The example audit queries request the process control alarm definitions stored by the field devices 106 and/or the controller 108 (e.g., the runtime process control alarm definitions), and/or a status (e.g., enabled, disabled, suppressed, etc.). In some examples, the audit queries also request the operational state (e.g., idle, running, shutdown, etc.) of the field devices 106 and/or the controller 108. The example alarm handler 102 designates the audit queries as low priority so that the field devices 106 and/or the controllers 108 process the audit queries when doing so would not interfere with the normal operation of the field devices 106 and/or the controllers 108.

The alarm handler 102 of the illustrated example generates reports based on results of the audit queries sent to the field devices 106 and/or the controller 108. In some examples, the alarm handler 102 generates a difference report by comparing the runtime process control alarm definitions received from the field devices 106 and/or the controller 108 to corresponding design process control alarm definitions in an alarm definition database 120. Additionally or alternatively, in some examples, the alarm handler 102 generates a runtime report that reports the runtime process control alarm definitions and their associated statuses which were received from the field devices 106 and/or the controller 108.

The example alarm handler 102 receives audit report requests from the workstation 116. The audit report requests specify which process control alarms are to be audited. For example, an audit report request may specify that process control alarms associated with the area 114a, 114b corresponding to the MATERIAL_PREP_AREA tag are to be audited. Additionally, the audit report requests specify what type of report (e.g., a runtime report, a difference report, etc.) is to be generated by the example alarm handler 102. In some examples, the alarm handler 102 accepts audit report requests with command line switches. Command line switches are arguments that modify the audit report request. The command line switches allow an application (e.g., a third-party application, etc.) executing on the workstation 116 to generate a specific audit report request without being integrated into the alarm handler 102. Example command line switches that the example alarm handler 102 accepts are shown in Table 1 below.

TABLE 1

EXAMPLE COMMAND LINE SWITCHES

| Command Line Switch | Example | Description |
| --- | --- | --- |
| File Path | "H:\AlarmReports\Runtime\" | The location on a network to which the alarm handler is to save the audit report. |
| Report Type | "runtime" | The type of report (e.g., a runtime report, a difference report, etc.) to generate. |
| Enabled Alarms | "/enabledalarms" | Specifies whether the alarm handler is to only audit |

TABLE 1-continued

EXAMPLE COMMAND LINE SWITCHES

| Command Line Switch | Example | Description |
|---|---|---|
| | | enabled process control alarms. |
| Process Alarms | "/processalarms" | Specifies whether the alarm handler is to only audit process alarms. |
| System Alarms | "/sysalarms" | Specifies whether the alarm handler is to only audit system alarms. |
| Area | "/area:PRODUCTION1_AREA" | The alarm handler audits process control alarms corresponding to I/O devices and/or field devices associated with the specified area. |
| Controller | "/controller:CON1" | The alarm handler audits process control alarms corresponding to I/O devices and/or field devices associated with the specified controller. |
| I/O Device | "/iodevice:LTB412" | The alarm handler audits process control alarms corresponding to field devices associated with the specified I/O device. |
| Field Device | "/fielddevice:MXR_MAT2" | The alarm handler audits process control alarms associated with the field device. |

In the illustrated example, after receiving an audit report request, the alarm handler 102 determines which process control alarms are to be audited. In some examples, the alarm handler 102 audits all the process control alarms associated with the field devices 106 and/or the controllers 108 in the process control system 100. Alternatively, in some examples, the alarm handler 102 audits process control alarms specified by the audit report request (e.g., via the command line switches) based on the data structure 200 stored in the system engineering database 118 and/or the process control alarm definitions stored in the alarm definition database 120. For example, if the audit report request specifies process control alarms associated with an area (e.g., the area 114a) designated by the PRODUCTION1_AREA tag, the alarm handler 102 retrieves the field device IDs 202 from the system engineering database 118 associated with the "PRODUCTION1_AREA" area tag 208.

In some examples, the alarm handler 102 maintains a request queue. In such examples, the alarm handler 102 places new audit report requests on the request queue and handles the audit report requests to limit the processor and bandwidth resources of the process control system 100 required to respond to the audit report requests. For example, if the alarm handler 102 receives audit report requests at a high frequency (e.g., in a denial-of-service style attack), the alarm handler 102 places the audit report requests on the request queue (or, in some cases, delete some of the audit report requests) and process the requests one at a time.

To audit the process control alarms, the example alarm handler 102 generates audit queries to send, via the field bus 104, to the field devices 106 and/or the controllers 108. The example alarm handler 102 manages the audit queries so that the performance of the process control system 100 is not degraded. In some examples, the alarm handler 102 designates the audit queries to be low priority so that the field devices 106 and/or the controllers 108 delay responding to the audit queries if there is an action (e.g., an alarm message, etc.) having a higher priority. In some examples, the alarm handler 102 maintains a request queue for the generated audit queries. In such examples, the alarm handler 102 controls a rate at which the audit queries are sent to the field devices 106 and/or the controllers 108.

In the illustrated example, the alarm handler 102 receives responses to the audit queries. Because, in some examples, the audit queries are designated with a low priority, the responses may be received by the alarm handler 102 over a period of time. In the illustrated example, the alarm handler 102 tracks which audit queries are associated with which audit report request. The example alarm handler 102 generates the audit reports corresponding to the audit report requests when the alarm handler 102 has received the responses to the audit queries associated with the audit report request. In some examples, if multiple audit report requests result in audit queries to the same field device 106 and/or the same controller 108, the alarm handler 102 associates the audit queries sent to the field device 106 and/or the controller 108 to the multiple audit report requests. In such a manner, the alarm handler 102 conserves the resources (e.g., the processing cycles, the bandwidth, etc.) of the process control system 100 by reducing the number to audit queries to which the field device 106 and/or the controllers 108 must respond.

Figure 3:
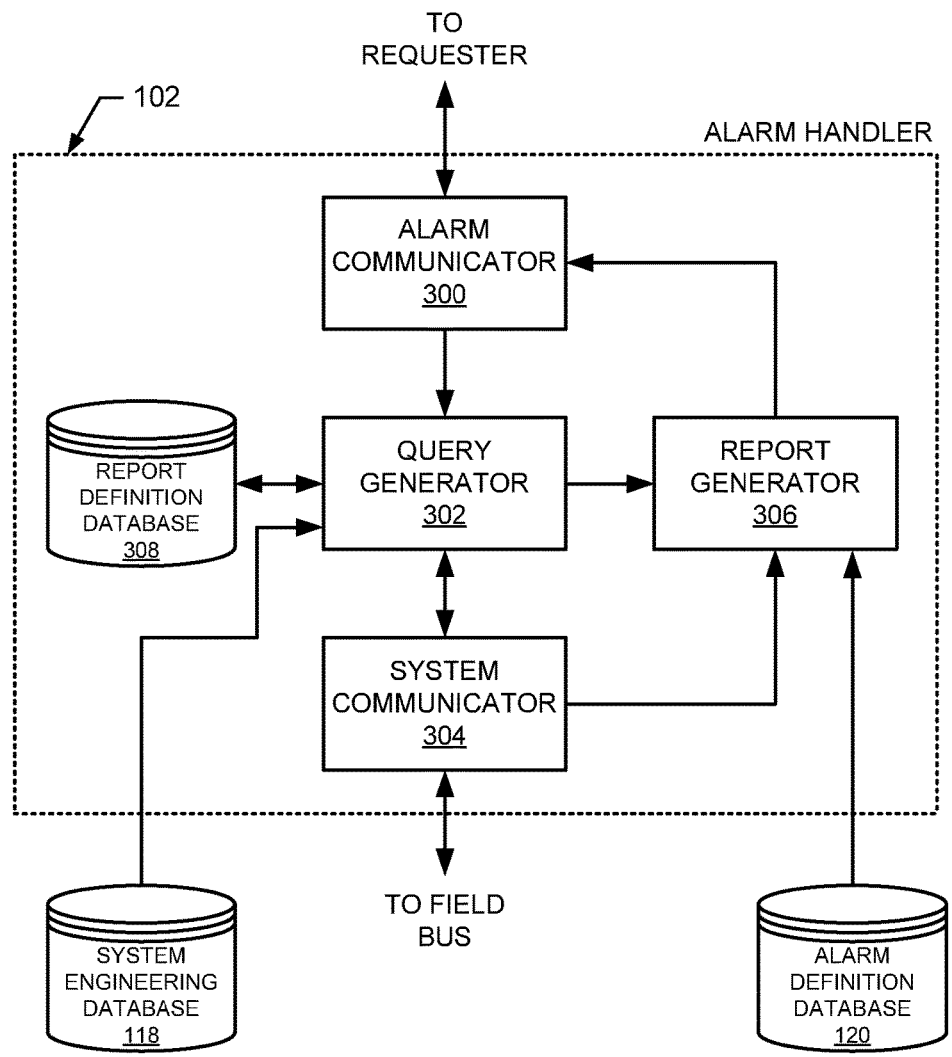
FIG. 3 illustrates an example implementation of the example alarm handler of FIG. 1 to audit process control alarms in the process control system.

FIG. 3 illustrates an example implementation of the example alarm handler 102 of FIG. 1 to audit process control alarms in the process control system 100 of FIG. 1. The alarm handler 102 of the illustrated example includes an example alarm communicator 300, an example query generator 302, an example system communicator 304, and an example report generator 306. The example alarm communicator 300 is in communication with the workstation 116 of FIG. 1. In some examples, the alarm communicator 300 communicates with the workstation 116 via an Internet protocol connection (e.g., Transmission Control Protocol/Internet Protocol (TCP/IP), etc.). In some examples, the alarm communicator 300 accepts command line entry.

The example alarm communicator 300 receives audit report requests and/or audit report definitions. The example audit report requests specify areas 114a, 114b (FIG. 1), controllers 108 (FIG. 1), I/O devices 110 (FIG. 1) and/or field devices 106 (FIG. 1) for which associated process control alarms are to be audited. In some examples, the audit report requests also include filter options to further refine which of the process control alarms are to be audited. For example, an audit report request may specify the process control alarms associated with the field device 106 with the MXR_MAT1 field device ID 202 (FIG. 2) and may specify a filter value of "ENABLED."

The audit report definitions specify areas 114a, 114b (FIG. 1), controllers 108 (FIG. 1), I/O devices 110 (FIG. 1) and/or field devices 106 (FIG. 1) for which associated process control alarms are to be audited. In some examples, the audit report definitions also include filter options to further refine which of the process control alarms are to be audited. When an audit report definition is received by the alarm communicator 300, the example alarm communicator 300 stores the audit report definition in an example report definition database 308. In such a manner, an audit report request may specify an audit report definition in the report definition database 308 to specify which process control alarms are to be audited. In some examples, the alarm communicator 300 assigns a request ID to a received audit report request to facilitate tracking audit queries generated in response to the audit report request.

In the illustrated example, the query generator 302 receives or otherwise retrieves the audit report requests from the alarm communicator 300. The example query generator 302 determines which process control alarms are to be audited and generates audit queries to be sent to the field devices 106 and/or the controllers 108 associated with the alarms to be audited. To determine which audit queries to generate, the example query generator 302 determines which field devices 106 and/or controllers 108 are specified by the audit report request. In the illustrated example, the query generator 302 retrieves field device IDs 202 (FIG. 2) and/or controller IDs 204 (FIG. 2) from the system engineering database 118 (FIG. 1) corresponding to the areas 114a, 114b, controllers 108, I/O devices 110, and/or field devices 106 specified in the audit report request. For example, if an audit report request specifies a particular area tag 208 (FIG. 2), the query generator 302 retrieves the field device IDs 202 and/or the controller IDs 204 (FIG. 2) from the system engineering database 118 associated with that area tag 208. In some examples, the audit queries are associated with the request ID assigned to the audit report request by the alarm communicator 300.

In the illustrated example of FIG. 3, the system communicator 304 maintains a status update queue to manage transmission of the audit queries to the field devices 106 and/or controllers 108 with process control alarms to be audited. After the query generator 302 generates an audit query, the system communicator 304 places the audit query on the status update queue. In some examples, if the system communicator 304 subsequently receives an audit query from the query generator 302 that corresponds to an audit query in the status update queue (e.g., an audit query destined for the same field device 106 and/or the same controller 108 as the audit query already in the status update queue), the system communicator 304 combines the two audit queries. In some such examples, to combine the two audit queries, the system communicator 304 associates the request ID corresponding to the received audit query with the audit query already in the status update queue.

The example system communicator 304 manages the transmission of the audit queries over the field bus 104 so as not to interfere with the operation of the process control system 100. In some examples, the system communicator 304 controls a frequency at which the audit queries on the status update queue are sent to the respective field devices 106 and/or the respective controllers 108. Additionally or alternatively, in some examples, the system communicator 304 designates the audit queries as low priority messages. The example system communicator 304 tracks audit responses containing process control alarm definitions received from the example field devices 106. In the illustrated example, the system communicator 304 forwards the audit responses to the example report generator 306.

In the illustrated example, the report generator 306 receives or otherwise retrieves the audit report requests from the example query generator 302. The audit report request specifies a type of audit report (e.g., a runtime report, a difference report, etc.) for the report generator 306 to produce. The example report generator 306 receives the audit responses from the system communicator 304. The example audit responses include runtime process control alarm definitions used by the corresponding field devices 106. In some examples, the audit responses are received over a period of time as field devices 106 respond to the audit queries. In some such examples, the report generator 306 tracks which audit responses are requested (e.g., based on the audit report requests received from the query generator 302). When the example report generator 306 receives the audit response for an audit report request, the example report generator 306 generates an audit report. In some examples, the report generator 306 waits a period of time (e.g., six hours, a day, a week, etc.) to receive the audit responses. In such examples, when the period of time expires, the report generator 306 generates the audit report, which includes error messages for process control alarms for which the corresponding audit response was not received.

To generate a runtime report, the report generator 306 compiles the audit responses from the field devices 106 and applies the filter values if any are included in the audit report request. For example, if an audit report request specifies a filter for excluding suppressed process control alarms, the report generator 306 removes audit response that indicate that the corresponding process control alarms are suppressed (e.g., shelved, out-of-service, etc.).

Figure 4:
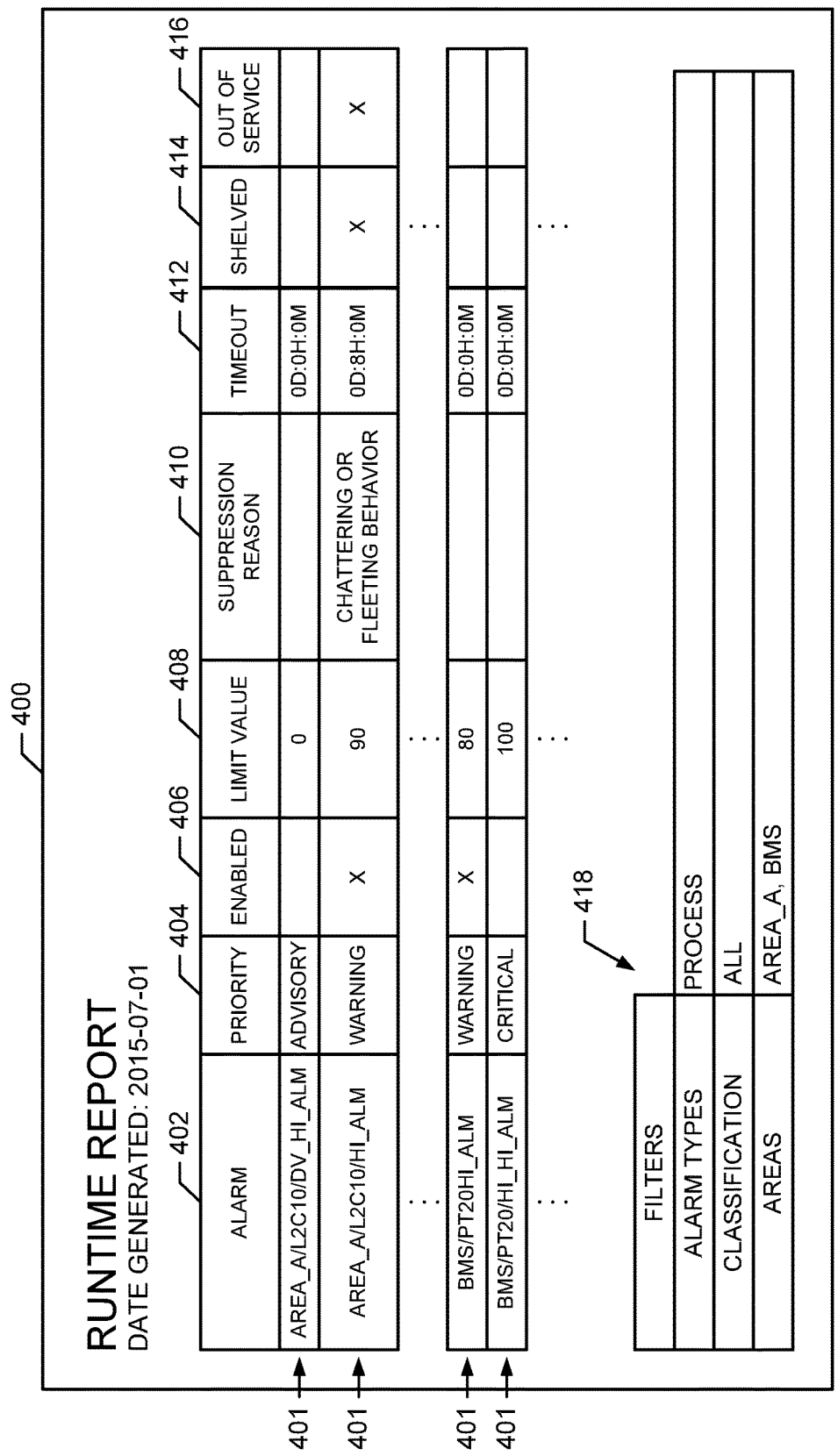
FIG. 4 depicts an example runtime report generated by the example alarm handler of FIGS. 1 and 3.

In some examples, the audit report request specifies a runtime report. FIG. 4 illustrates an example runtime report 400 generated by the report generator 306. In the illustrated example, the runtime report 400 includes runtime records 401. The example runtime records 401 include the information in the runtime process control definitions and information regarding suppression of the process control alarm. In the illustrated example, the runtime records 401 include an example process control alarm path 402, an example priority indicator 404, an example enablement flag 406, an example limit value 408, an example suppression reason 410, an example suppression timeout value 412, an example shelved suppression flag 414, and an example out-of-service suppression flag 416. In the illustrated example, the runtime report 400 includes the filter values 418 that indicate which filters were included in the audit report request. In the illustrated example, the process control alarm path indicates the area tag 208, the controller ID 204 and a process control alarm ID associated with the respective process control alarm. The example priority indicator 404 indicates a priority level for the respective process control alarm. The example enablement flag 406 indicates whether the process control alarm is ENABLED (e.g., an enabled-indicating value) or DISABLED (e.g., a disabled-indicating value). The example limit value 408 indicates the runtime limit value that triggers the process control alarm. The example suppression reason 410 contains a brief explanation of the reason the respective process control alarm is suppressed. The example suppression timeout value 412 indicates a time until the process control alarm is unshelved. The example shelved suppression flag 414 indicates whether the corresponding process control alarm is shelved. The example out-of-service suppression flag 416 indicates whether the corresponding process control alarm is out-of-service.

In some examples, the audit report request specifies a difference report. To generate a difference report, the report generator 306 of FIG. 3 retrieves design process control alarm definitions from the alarm definition database 120 corresponding to the runtime process control alarm definitions included in the audit responses received from the system communicator 304. The example report generator 306 determines differences between the runtime process control alarm definitions and the design process control alarm definitions.

Figure 5:
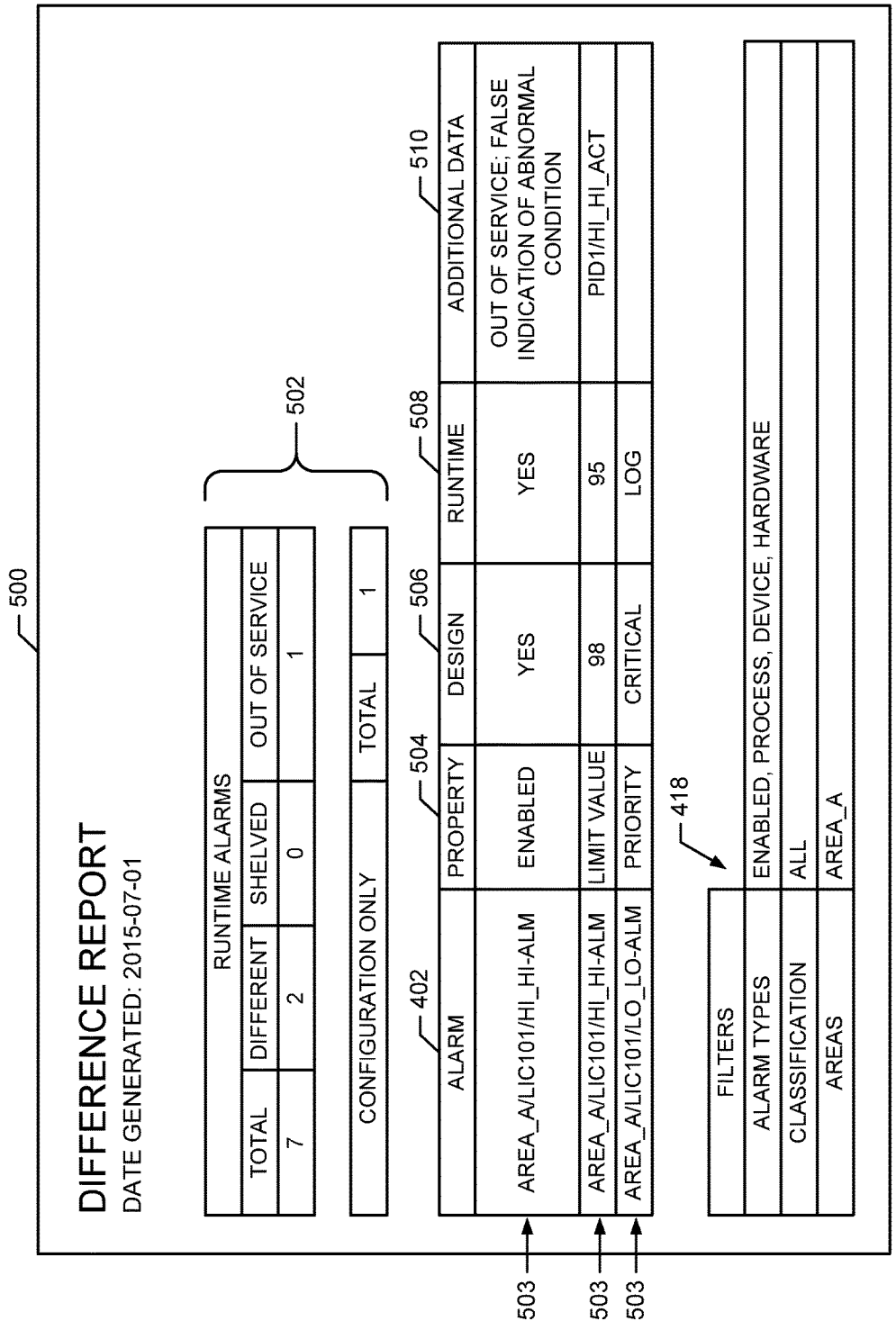
FIG. 5 depicts an example difference report generated by the example alarm handler of FIGS. 1 and 3.

FIG. 5 illustrates an example difference report 500 generated by the example report generator 306. In the illustrated example, the difference report 500 includes a summary 502 of the difference between the runtime process control alarm definitions and the design process control alarm definitions. The example difference report 500 includes example difference records 503. In the illustrated example, the difference records 503 include an example process control alarm path 402, an example property field 504, an example design field 506, an example runtime field 508, and an example additional data field 510. In the illustrated example, the process control alarm path 402 indicates the area tag 208, the controller ID 204 and a process control alarm ID associated with the respective process control alarm. The example property field 504 indicates which property (e.g., the priority indicator 404, the enablement flag 406, the limit value 408, etc.) is different between the runtime process control alarm definitions and the design process control alarm definitions.

As illustrated in FIG. 5, a process control alarm (e.g., as indicated by the process control path 402) may be represented more than once on a difference report 500 if more than one property, as indicated by the property field 504, is different between the runtime process control alarm definition and the corresponding design process control alarm definition. The example design field 506 holds the value corresponding to the design process control alarm definition of the property indicated by the property field 504. The example runtime field 508 holds the value corresponding to the runtime process control alarm definition of the property indicated by the property field 504. The example additional data field 510 includes other aspects (e.g., from suppression reason 410, the suppression timeout value 412, the shelved suppression flag 414, the out-of-service suppression flag 416, etc.) of the runtime process control alarm definition. For example, when a runtime process control alarm definition indicates that the process control alarm is suppressed, the report generator includes the suppression related data in the additional data field 510. In the illustrated example, the difference report 500 includes the filter values 418 that indicate which filters were included in the audit report request.

The report generator 306 of FIG. 3 generates the report (e.g., the runtime report 400, the difference report 500, etc.) in a standardized format (e.g., a DSV format, an HTML format, an XML format, a JSON format, etc.). The example report generator forwards the report to the example alarm communicator 300. In some examples, the alarm communicator 300 sends the generated report to the workstation 116. Alternatively, in some examples, the alarm communicator 300 saves the report to a location on a network that is specified by the audit report request.

While an example manner of implementing the example alarm handler 102 of FIG. 1 is illustrated in FIG. 3, one or more of the elements, processes and/or devices illustrated in FIG. 3 may be combined, divided, re-arranged, omitted, eliminated and/or implemented in any other way. Further, the example alarm communicator 300, the example query generator 302, the example system communicator 304, the example report generator 306 and/or, more generally, the example alarm handler 102 of FIG. 1 may be implemented by hardware, software, firmware and/or any combination of hardware, software and/or firmware. Thus, for example, any of the example alarm communicator 300, the example query generator 302, the example system communicator 304, the example report generator 306 and/or, more generally, the example alarm handler 102 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, the example alarm communicator 300, the example query generator 302, the example system communicator 304, and/or the example report generator 306 is/are hereby expressly defined to include a tangible computer readable storage device or storage disk such as a memory, a digital versatile disk (DVD), a compact disk (CD), a Blu-ray disk, etc. storing the software and/or firmware. Further still, the example alarm handler 102 of FIG. 1 may include one or more elements, processes and/or devices in addition to, or instead of, those illustrated in FIG. 3, and/or may include more than one of any or all of the illustrated elements, processes and devices.

Figure 6:
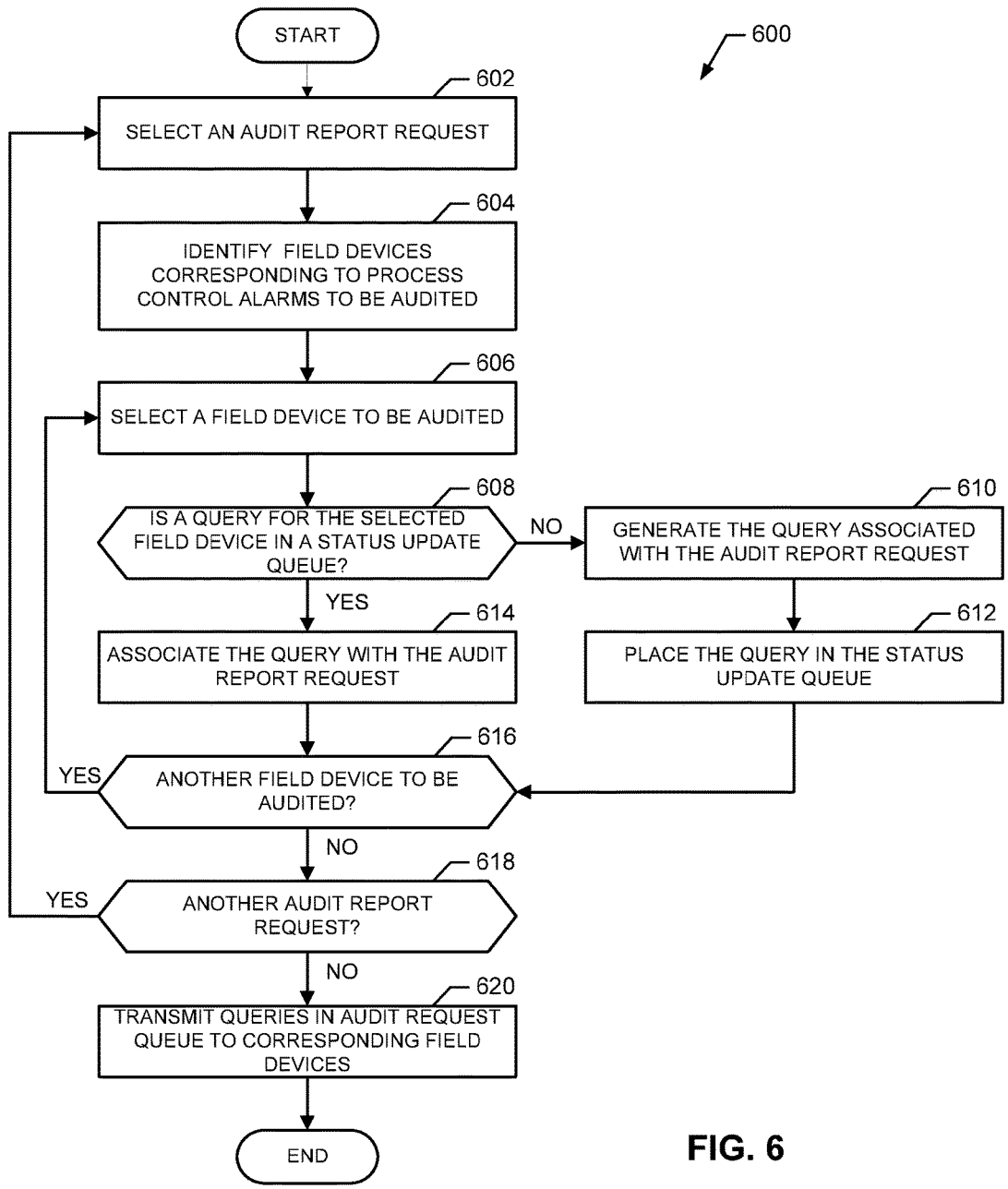
FIG. 6 is a flow diagram representative of an example method that may be executed to implement the alarm handler of FIGS. 1 and 3 to audit process control alarms in the process control system.
Figure 7:
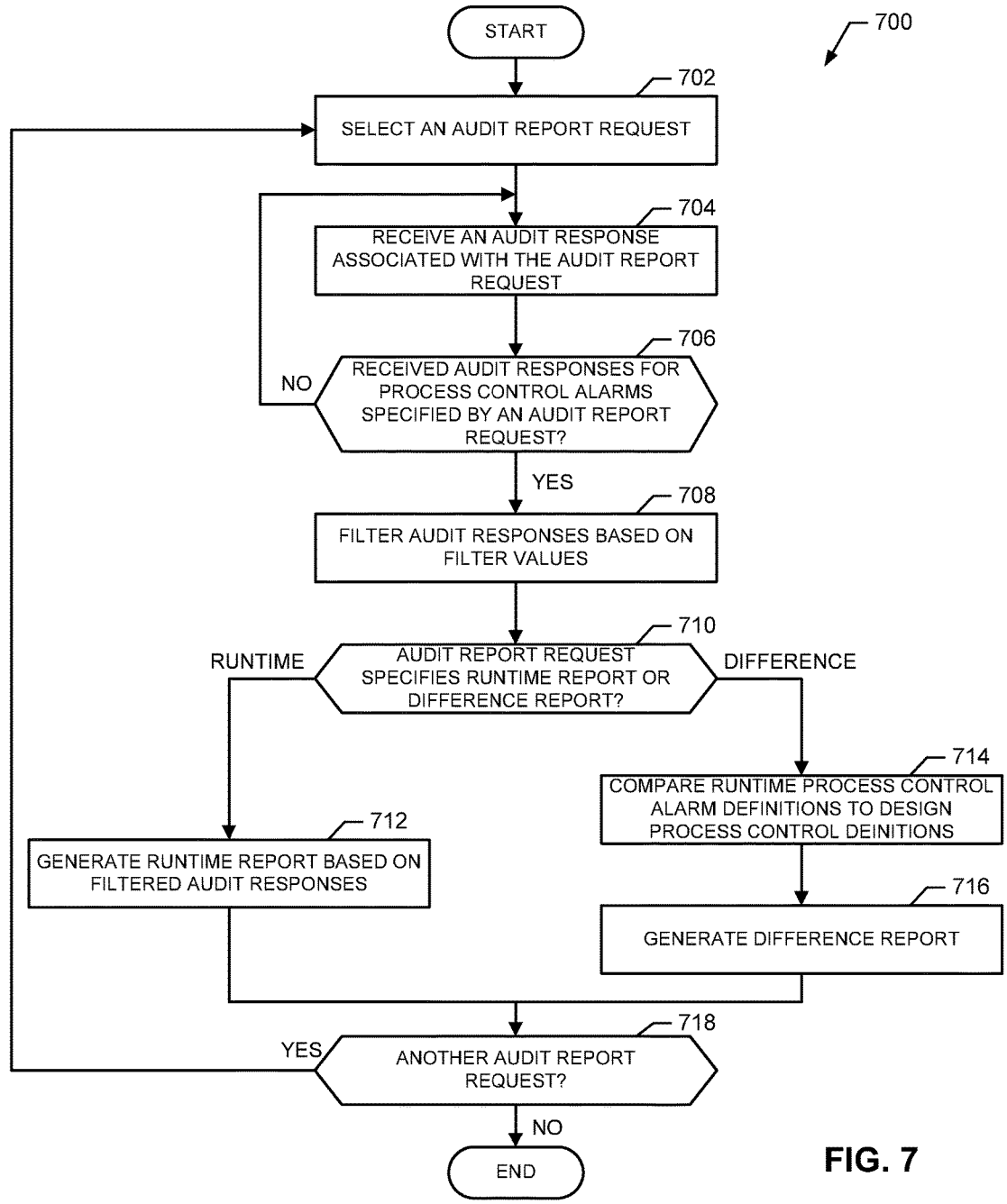
FIG. 7 is a flow diagram representative of an example method that may be executed to implement the alarm handler of FIGS. 1 and 3 to generate audit reports.

Flowchart representative of example methods for implementing the alarm handler 102 of FIGS. 1 and 3 are shown in FIGS. 6 and 7. In this example, the methods comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program(s) is/are described with reference to the flowcharts illustrated in FIGS. 6 and 7, many other methods of implementing the example alarm handler 102 may alternatively be used. For example, the order of execution of the blocks may be changed, and/or some of the blocks described may be changed, eliminated, or combined.

As mentioned above, the example methods of FIGS. 6 and 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 6 and 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 6 is a flow diagram representative of an example method 600 that may be executed to implement the alarm handler 102 of FIGS. 1 and 3 to audit process control alarms in the process control system 100 of FIG. 1. Initially, at block 602, the alarm communicator 300 (FIG. 3) selects an audit report request. In some examples, the alarm communicator 300 maintains a request queue to store audit report requests received from the workstation 116 (FIG. 1). At block 604, the query generator 302 identifies field devices 106 (FIG. 1) that have process control alarms that are to be audited based on the audit report request selected at block 602. To identify the field devices 106, the example query generator 302 retrieves field device IDs 202 corresponding to controller IDs 204, I/O device IDs 206 and/or area tags 208 included in the audit report request. In some examples, the audit report request specifies particular field device ID(s) 202.

At block 606, the query generator 302 selects one of the field devices 106 corresponding to the field device IDs 202 identified at block 604. At block 608, the query generator 302 determines whether an audit query corresponding to the field device is in the status update queue maintained by system communicator 304. If an audit query corresponding to the field device is not in the status update queue, program control proceeds to block 610. Otherwise, if an audit query corresponding to the field device is in the status update queue, program control proceeds to block 614. At block 610, the query generator 302 generates an audit query that requests the runtime process control alarm definitions stored by the field device 106 selected at block 606 and associated the audit query with the audit report request (e.g., via the request ID) selected at block 602. At block 612, the system communicator places the audit query generated at block 610 on the status update queue.

At block 614, the query generator 302 associates the audit query in the status update queue with the with the audit report request (e.g., via the request ID) selected at block 602. In such a manner, an audit query in the status update queue may be associated with more than one audit report request. At block 616, the query generator 302 determines whether there is another field device 106 for which to generate an audit query. If there is another field device 106 for which to generate an audit query, program control returns to block 606. Otherwise, if there is not another field device 106 for which to generate an audit query, program control advances to block 618. At block 618, the alarm communicator 300 determines whether there is another audit report request for which to generate audit queries. If there is another audit report request for which to generate audit queries, program control returns to block 602. Otherwise, if there is not another audit report request for which to generate audit queries, program control advances to block 620. At block 620, the system communicator 304 transmits the audit queries in the audit status update queue to the corresponding field devices via the field bus 104 (FIG. 1). The example method 600 then ends.

FIG. 7 is a flow diagram representative of an example method 700 that may be executed to implement the alarm handler 102 of FIGS. 1 and 3 to generate audit reports. Initially, at block 702, the report generator 306 selects an audit request report. At block 704, the report generator 306 receives an audit response associated with the audit report request selected at block 702. At block 706, the report generator 306 determines whether all of the audit responses associated with the audit report request have been received. If all of the audit responses associated with the audit report request have been received, program control advances to block 708. Otherwise, if all of the audit responses associated with the audit report request have not been received, program control returns to block 704.

At block 708, the report generator 306 filters the audit responses based on filter values specified in the audit report request selected at block 702. For example, if the report request specifies a filter value corresponding to whether the process control alarm is enabled, the report generator filters out the audit response with runtime process control alarm definitions that indicate that the corresponding process control alarm is disabled. At block 710, the report generator 306 determines whether the audit report request specifies a runtime report or a difference report. If the audit report request specifies a runtime report, program control advances to block 712. Otherwise, if the audit report request specifies a difference report, program control advances to block 714. At block 712, the report generator 306 generates a runtime report (e.g., the runtime report 400 of FIG. 4) based on the runtime process control alarm definitions in the audit responses filtered at block 708.

At block 714, the report generator 306 compares the runtime process control alarm definitions included in the audit response to the corresponding design process control alarm definitions in the alarm definition database 120. At block 716, the report generator 306 generates a difference report (e.g., the difference report 500 of FIG. 5) that includes the differences between the runtime process control alarm definitions and the corresponding design process control alarm definitions. For example, a runtime process control alarm definition may have a value limit (e.g., the value limit 408) of 95, while the corresponding design process control alarm definition has a value limit of 98. In such an example, the report generator would include a difference record 503 (FIG. 5) which would have an process control alarm path 402 corresponding to the process control path in the design process control alarm definition, a property filed 504 with a "LIMIT VALUE" value, a designed field 506 with a "98" value, and a runtime field with a "95" value.

At block 718, the report generator 718 determines whether there is another audit report request for which to generate an audit report. If there is another audit report request for which to generate an audit report, program control returns to 702. Otherwise, if there is not another audit report request for which to generate an audit report, the example method 700 ends.

Figure 8:
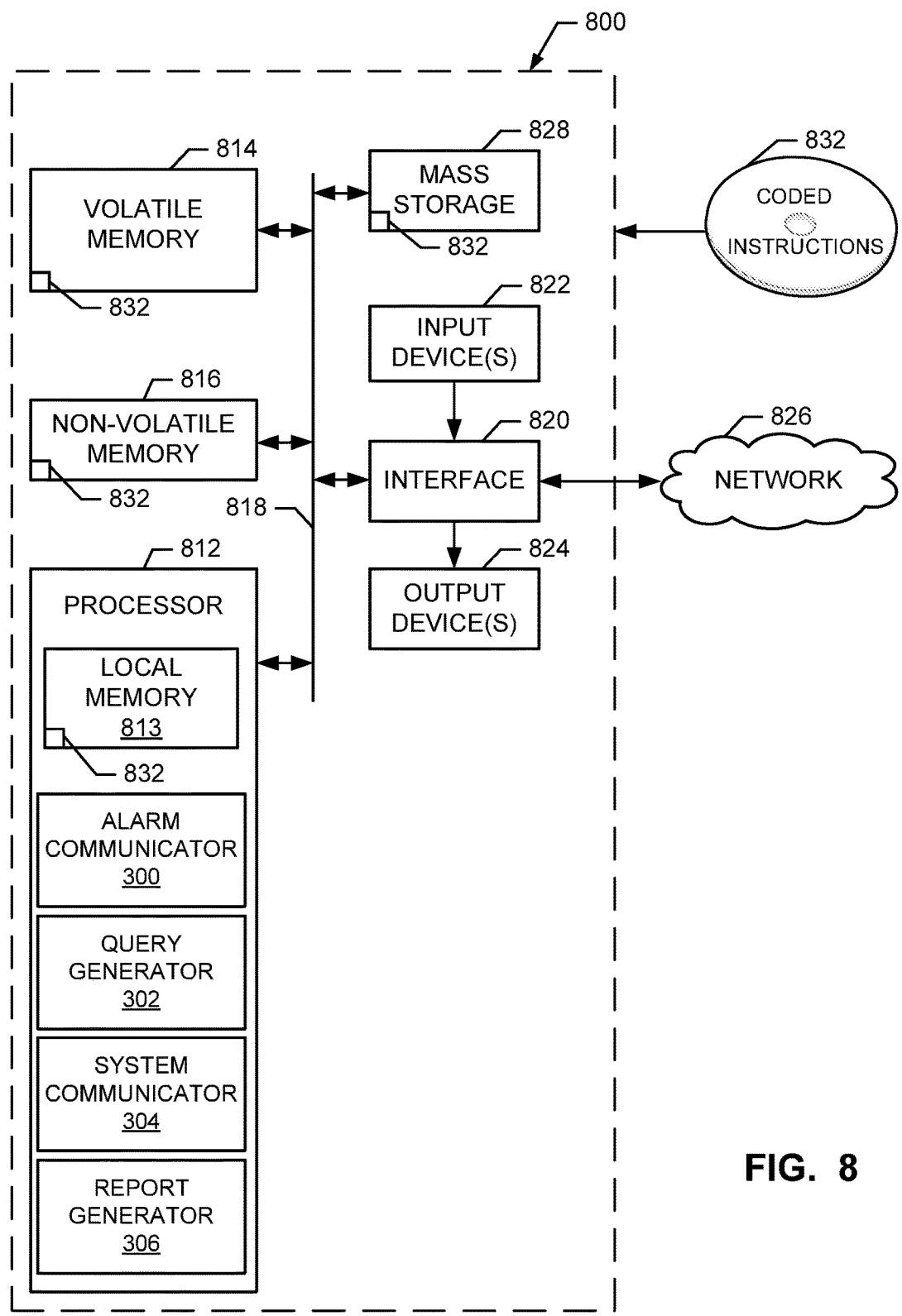
FIG. 8 is a block diagram of an example processor system structured to execute machine readable instructions to perform the methods represented by FIGS. 6 and/or 7 to implement the example alarm handler of FIGS. 1 and 3.

FIG. 8 is a block diagram of an example processor platform 800 capable of executing instructions to implement the methods of FIGS. 6 and 7 and the alarm handler 102 of FIGS. 1 and 3. The processor platform 800 can be, for example, a server, a workstations, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. In the illustrated example, the processor 812 is structured to include an example alarm communicator 300, an example query generator 302, an example system communicator 304, and an example report generator 306.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device (s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

Coded instructions 832 to implement the methods of FIGS. 6 and/or 7 may be stored in the mass storage device 828, in the volatile memory 814, in the non-volatile memory 816, and/or on a removable tangible computer readable storage medium such as a CD or DVD.

From the foregoing, it will appreciated that the examples disclosed above generate audit reports for process control alarms in a process control system while managing processor and bandwidth resources of the process control system. The alarm handler disclosed above reduces exposure of the process control system to cyber threats using external OPC based runtime alarm auditing. In some examples, the alarm handler disclosed above reduces the taxation of the processing and bandwidth resources of the process control system by using low level connections (e.g., via the field bus) and managing multiple requests for audit reports.

Additionally, in some examples, the alarm handler disclosed above broadens the number of auditable process control alarms to process control alarms modifiable at runtime. The example alarm handler disclosed above allows audit report requests to specify particular logical and/or geographical areas of the process control system to audit, and audit report requests to include filter values to specify process control alarms of interest (e.g., process control alarms related to environmental protection or safety).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to manage audit report requests in a process control system, the method comprising:
    determining alarms to be audited based on alarm audit parameters included with one of the audit report requests;
    identifying components in the process control system that correspond to the alarms to be audited;
    if a query to request a status of a particular one of the alarms to be audited is not in a status update queue, generating a query associated with the one of the audit report requests to request the status of the particular one of the alarms from the corresponding component;
    if the query to request the status of a particular one of the alarms to be audited is in the status update queue, associating the one of the audit report requests to the query;
    transmitting, via a process control system bus, queries in the status update queue to the corresponding ones of the components when the corresponding components are available, the queries to be designated as low priority; and
    generating an audit report based on responses generated in response to the queries received from the components.

2. A method as defined in claim 1, wherein the components in the process control system include at least one of a field device, an I/O device, or a controller.

3. A method as defined in claim 1, further including maintaining an audit report request queue to store the audit report requests.

4. A method as defined in claim 1, wherein the identifying of the components in the process control system that correspond to the alarms to be audited further includes retrieving component identifiers corresponding to the components from a system engineering database based on the alarm audit parameters included with the one of the audit report requests.

5. A method as defined in claim 1, wherein the alarm audit parameters specify an area defined in the process control system that includes a plurality of the components.

6. A method as defined in claim 1, wherein the generating the audit report further includes comparing differences between runtime alarm definitions included in the responses and corresponding design alarm definitions stored in an alarm definition database.

7. A method as defined in claim 1, wherein the generating the audit report further includes determining operation states of the components based on the responses received from the components.

8. A method as defined in claim 1, wherein the alarms to be audited include any of the alarms in the process control system.

9. An apparatus to manage audit report requests in a process control system, the apparatus comprising:
a query generator to, via a processor:
determine alarms to be audited based on alarm audit parameters included with one of the audit report requests;
identify components in the process control system that correspond to the alarms to be audited;
if a query to request a status of a particular one of the alarms to be audited is not in a status update queue, generate a query associated with the one of the audit report requests to request the status of the particular one of the alarms from the corresponding component; and
if the query to request the status of a particular one of the alarms to be audited is in the status update queue, associate the one of the audit report requests to the query;
a system communicator to transmit, via a process control system bus, queries in the status update queue to the corresponding ones of the components when the corresponding components are available, the queries to be designated as low priority; and
a report generator to generate an audit report based on responses generated in response to the queries received from the components.

10. An apparatus as defined in claim 9, wherein the components in the process control system include at least one of a field device, an I/O device, or a controller.

11. An apparatus as defined in claim 9, further including an alarm communicator to maintain an audit report request queue to store the audit report requests.

12. An apparatus as defined in claim 9, wherein the identifying the components in the process control system that correspond to the alarms to be audited further includes retrieving component identifiers corresponding to the components from a system engineering database based on the alarm audit parameters included with the one of the audit report requests.

13. An apparatus as defined in claim 9, wherein the alarm audit parameters specify an area defined in the process control system that includes a plurality of the components.

14. An apparatus as defined in claim 9, wherein to generate the audit report, the report generator is further to compare differences between runtime alarm definitions included in the responses and corresponding design alarm definitions stored in an alarm definition database.

15. An apparatus as defined in claim 9, wherein to generate the audit report, the report generator is further to determine operation states of the components based on the responses received from the components.

16. A tangible non-transitory computer readable medium comprising instructions which, when executed, cause a machine to at least:
determine alarms to be audited based on alarm audit parameters included with an audit report request;
identify components in a process control system that correspond to the alarms to be audited;
if a query to request a status of a particular one of the alarms to be audited is not in a status update queue, generate a query associated with the audit report request to request the status of the particular one of the alarms from the corresponding component;
if the query to request the status of a particular one of the alarms to be audited is in the status update queue, associate the audit report request to the query;
transmit, via a process control system bus, queries in the status update queue to the corresponding ones of the components when the corresponding components are available, the queries to be designated as low priority; and
generate an audit report based on responses generated in response to the queries received from the components.

17. A tangible non-transitory computer readable medium as defined in claim 16, wherein the components in the process control system include at least one of a field device, an I/O device, or a controller.

18. A tangible non-transitory computer readable medium as defined in claim 16, wherein the instructions, when executed, cause the machine further to maintain an audit report request queue to store at least one of the audit report request and other audit report requests.

19. A tangible non-transitory computer readable medium as defined in claim 16, wherein to identify the components in the process control system that correspond to the alarms to be audited, the instructions, when executed, cause the machine further to retrieve component identifiers corresponding to the components from a system engineering database based on the alarm audit parameters included with the audit report request.

20. A tangible non-transitory computer readable medium as defined in claim 16, wherein the alarm audit parameters specify an area defined in the process control system that includes a plurality of the components.

21. A tangible non-transitory computer readable medium as defined in claim 16, wherein to generate the audit report, the instructions, when executed, cause the machine further to compare differences between runtime alarm definitions included in the responses and corresponding design alarm definitions stored in an alarm definition database.

* * * * *